United States Patent [19]

The

[11] 4,414,115
[45] Nov. 8, 1983

[54] REMOVAL OF COPPER AND ZINC SPECIES FROM BAYER PROCESS LIQUOR BY FILTRATION

[75] Inventor: Paul J. The, Murrysville, Pa.

[73] Assignee: Aluminum Company of America, Pittsburgh, Pa.

[21] Appl. No.: 332,442

[22] Filed: Dec. 21, 1981

[51] Int. Cl.³ .............................................. C02F 1/52
[52] U.S. Cl. ................................. 210/665; 210/673; 210/688; 210/777; 210/807; 210/506; 210/912; 423/37; 423/101
[58] Field of Search ............... 210/665, 667, 673, 688, 210/912, 702, 794, 506, 679, 807, 719, 721, 914, 777; 423/37, 101, 561

[56] References Cited

U.S. PATENT DOCUMENTS 3,989,623 11/1976 Neal ................................. 210/688
4,094,777 6/1978 Sugier et al. ..................... 210/688
4,280,925 7/1981 Kiefer ............................... 210/688

FOREIGN PATENT DOCUMENTS 2094528 2/1972 France ............................. 210/912
47-44155 11/1972 Japan .............................. 210/688
50-1560 1/1975 Japan .............................. 210/912
51-93548 8/1976 Japan .............................. 210/912

Primary Examiner—Benoît Castel
Attorney, Agent, or Firm—Glenn E. Klepac

[57] ABSTRACT

A Bayer process solution is filtered through a bed of particles of a granular substance containing $Fe_2O_3$ to remove copper and zinc species from the solution. The particles preferably have an $Fe_2O_3$ content of about 40 to 100% by weight. For more effective removal of zinc, the particles are coated with a metal sulfide, preferably zinc sulfide.

6 Claims, 4 Drawing Figures

4,414,115

REMOVAL OF COPPER AND ZINC SPECIES FROM BAYER PROCESS LIQUOR BY FILTRATION

BACKGROUND OF THE INVENTION

The purity of aluminum oxide for smelting, produced by the Bayer process digestion of bauxite, depends upon the type and quality of the bauxite. Certain minor impurities in bauxite are carried through the bauxite refining process and ultimately contaminate the metallic aluminum. A maximum zinc content of 0.03 weight percent can be tolerated in certain alloys. Theoretically, a zinc content of 0.03 weight percent in the metal is derived from an aluminum oxide containing about 0.02 weight percent ZnO. To produce satisfactory aluminum metal, the CuO and ZnO contents of aluminum oxide should generally be held to less than about 0.015 and 0.023 weight percent, respectively.

Methods for removal of copper and zinc from the Bayer process liquor are known in the prior art. However, each of these prior art methods suffers from one or more serious disadvantages making it less than entirely suitable for its intended purpose. For example, the following patents each disclose the lowering of zinc content in the Bayer liquor by addition of sodium sulfide to the liquor: U.S. Pat. Nos. 2,885,261, 3,445,186, 3,469,935, 4,282,191 and British Pat. No. 1,373,843.

Due to the amphoteric properties of zinc, there are very few $Zn^{++}$ ions in the alkaline green liquor. Nearly all of the zinc is present as zincate ions, $ZnO_2^=$ or $Zn(OH)_4^=$. The term "zinc species" as used herein refers to all forms of dissolved zinc present in industrial sodium aluminate solutions, including $Zn^{++}$, $ZnO_2^=$ and $Zn(OH)_4^=$ ions. In a plant liquor, the presence of aluminate and carbonate ions may lead to formation of colloidal zinc oxide or hydroxide. In addition, the Bayer liquor includes other ions which will also react with sulfide ions. Therefore, the reaction between zinc species and sulfide ions in the Bayer liquor is by no means stoichiometric. Precipitation of zinc sulfide by addition of sodium sulfide requires an excess of sulfide over the stoichiometric amount. This excess sulfide is an undesirable contaminant in the production of alumina. When the sulfide is converted to sulfate, the sulfate-containing liquor is corrosive to metal containers.

U.S. Pat. No. 2,885,261 reported that addition of sodium sulfide to the Bayer liquor presented another problem. More than half of the sodium sulfide charge can be expected to remain in the system and eventually be oxidized to sodium sulfate. Therefore, addition of sodium sulfide to a plant Bayer liquor stream for an extended period can result in a rapid increase of liquor contamination approaching approximately 50 grams per liter. This high sodium sulfate contamination of the liquor stream imposed serious operating difficulties, such as slowdown of aluminum hydroxide precipitation and production of a slightly finer product. It was claimed that the problem could be overcome by adding sodium sulfide to only about one-half of the total liquor stream.

Another publication has indicated that high sodium sulfide concentration in the Bayer liquor stream causes high iron levels in aluminum hydroxide precipitated from the stream. See V. V. Grachev and S. I. Kuznetsov, "The Influence of Various Sulfur Compounds on the Solubility of Iron in Alkaline and Aluminate Solutions," *Tsvetnaya Metallurgiya*, Volume 3, 1974, pages 63–67.

A filtration process has previously been used to remove suspended solids and colloidal iron from Bayer liquor. See L. K. Hudson, "Alcoa's Process Filter," *Light Metals*, Volume 3, 1974, pages 737–744. Sand particles in the filter used in this process contained $Fe_2O_3$. However, the ability of such filter to remove copper and zinc species from solution has not previously been discovered.

In view of the numerous difficulties that may arise when soluble sulfides are added to the Bayer liquor streams to precipitate zinc or copper, there is a need for a process that will remove zinc or copper from an aluminate solution without adding sulfide to the solution.

It is a principal object of the present invention to provide a process for removal of copper and zinc species from a sodium aluminate solution without increasing the sulfide content of the solution.

It is a related object of the invention to provide a process for removal of copper and zinc species from a sodium aluminate solution that is economically suitable for practice on an industrial scale.

Additional objects and advantages of the present invention will become apparent to persons skilled in the art from the following specification.

SUMMARY OF THE INVENTION

The present invention can be summarized as being a process for decreasing the level of copper or zinc impurities in an alkali metal aluminate solution without increasing the sulfide content of the solution, by filtering the solution through a bed of granular particles. The particles contain $Fe_2O_3$, and they preferably have an $Fe_2O_3$ content of at least 10 percent by weight. In a particularly preferred embodiment the $Fe_2O_3$ content is about 40 to 100 percent by weight.

The granular particles preferably have an average particle size of about 100 to 400 $\mu m$ and the particle bed optimally has a height of at least 38 cm.

The process of the invention is practiced in a preferred form by initially preparing a bed of particles of a granular material containing $Fe_2O_3$. The particles are coated by passing a saturated solution of zinc sulfide through the bed. The coated particles are washed with deionized water. Solutions of sodium aluminate containing copper or zinc impurities filtered by passage through the bed exhibit reduced concentrations of impurities. After filtration, the bed is rejuvenated by washing the particles with a 1.0 N aqueous solution of an inorganic acid, preferably HCl.

When practiced on an industrial scale, the alkali metal aluminate solution referred to above is a settler overflow liquor produced in the Bayer process.

DETAILED DESCRIPTION OF A PREFERRED EMBODIMENT

Figure 1:
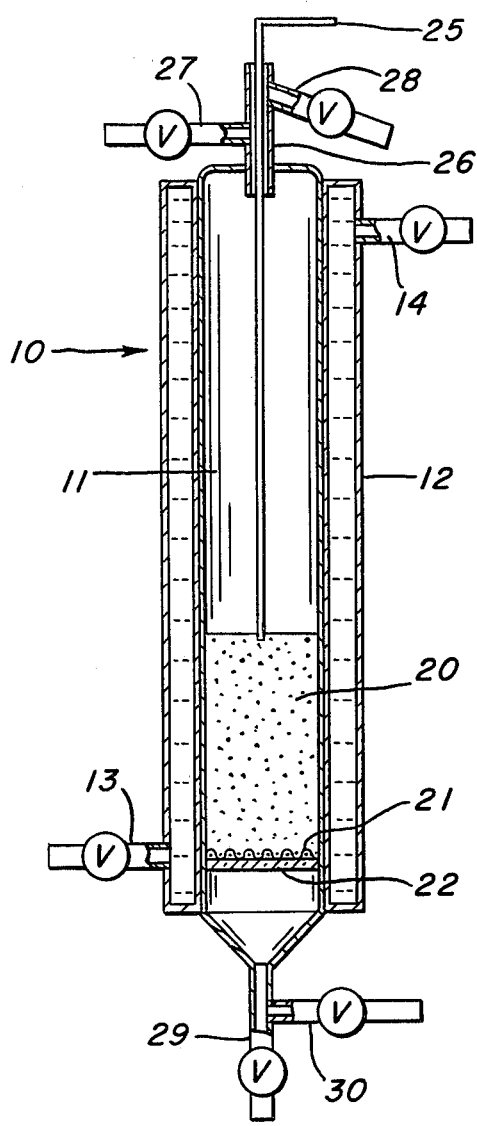
FIG. 1 is a schematic illustration of a bench scale apparatus for performing the filtration process of the invention.

In accordance with the present invention, there is provided a process filter 10 shown in FIG. 1. The process filter 10 comprises a generally cylindrical heat-resistant glass tube 11 having a height of 182.7 cm and 4.4 cm in diameter. A hot water jacket 12 encompasses the tube 11 and includes a water inlet opening 13 and a water outlet opening 14. Hot water in the jacket 12 maintains the temperature of the process filter 10 at about 80° C. The tube 11 contains a filter bed 20 comprising granular particles of sand produced during bauxite digestion. The sand bed 20 is supported by a 149 μm stainless steel screen 21 on top of a 74.2 μm fritted glass screen 22.

The sand particles contain $Fe_2O_3$ and preferably have an $Fe_2O_3$ content of at least 10% by weight with a range of 40-100 percent by weight being preferred. A percentage analysis of a sand that has been found suitable for practicing the process of the invention is shown in Table 1. A particle size analysis of this sand appears in Table 2. Sands having an average particle size in the range of about 100 to 400 μm are preferred.

TABLE 1

| Sand Analysis | |
|---|---|
| Component | Percentage by Weight |
| $SiO_2$ | 10.2 |
| $Fe_2O_3$ | 56.4 |
| $TiO_2$ | 3.19 |
| $Al_2O_3$ | 16.6 |
| $Na_2O$ | 0.53 |
| CaO | 0.72 |
| MgO | 0.11 |
| $P_2O_5$ | 0.11 |
| MnO | 0.04 |
| CuO | 0.02 |
| ZnO | 0.03 |
| $Cu_2O_3$ | 0.13 |
| LOF* | 11.9 |

*Loss on fusion at 1000° C.

TABLE 2

| Particle Size Distribution of Sand Particles (percentage by weight) |
|---|
| +119 μm = 100% |
| +210 μm = 44.5% |
| +297 μm = 34.5% |
| +420 μm = 10.5% |

A sparging tube 25 entering the process filter 10 through a top opening 26 periodically delivers caustic aluminate liquor or other sparging fluid to the filter bed 20. The sparging fluid fluidizes an upper portion of the bed 20 to prevent accumulation of a mud film. A feed liquor inlet 27 and a backwash liquor outlet 28 also communicate with the top opening 26. Filtered liquor leaves a bottom portion of the process filter 10 through a filtrate outlet 29. A backwash liquor inlet 30 communicates with the filtrate outlet 29. The filter bed 29 is backwashed periodically with spent liquor to prevent any undue accumulation of mud on top of the bed 20.

In a preferred embodiment, particles of sand in the filter bed 20 are coated with a metal sulfide prior to operation. The particles are coated by passing a saturated solution of a soluble metal sulfide through the bed 20. A saturated zinc sulfide solution has been found suitable for this purpose. Sulfide contamination of the filtrate is avoided by washing the coated particles with water or liquor prior to filtering.

EXAMPLES

Settler overflow liquors used in the following experiments were obtained by performing laboratory autoclave digests using conventional Bayer process technology. 1290 grams bauxite were digested with 26 grams lime and 10 liters plant spent liquor of 63.9 g/L $Al_2O_3$, 179.1 g/L caustic soda and 249.1 g/L total alkali expressed as the equivalent of grams per liter $Na_2CO_3$. The chemical analysis of the bauxite is shown in Table 3.

TABLE 3

| Chemical Analysis of Bauxite Used | |
|---|---|
| Component | Weight % |
| $SiO_2$ | 9.81 |
| $Al_2O_3$ | 44.40 |
| $Fe_2O_3$ | 20.00 |
| $TiO_2$ | 2.36 |
| CaO | 1.10 |
| $P_2O_5$ | 2.01 |
| CuO | 0.03 |
| ZnO | 0.05 |
| LOF* | 18.50 |

*Loss on fusion at 1000° C.

Digests were conducted at 230° C. and 550 kPa for 15 minutes. The digested slurries were desanded, treated with the appropriate amount of causticized starch solution and settled. The settler overflow liquors were separated from the settled mud by decantation and passed through the process filter 10. Some of the experiments were conducted by passing the liquor through the sand bed coated with a saturated zinc sulfide solution to promote zinc removal from the process liquor. Samples of filtered green liquor were collected at an interval of 1000 ml filtrate volume. The control run was conducted by filtering the settler overflow liquor using conventional Kelly pressure filter with a filter aid. Green liquor samples were submitted for chemical analysis and 500 ml of the liquor was adjusted to precipitation temperature, seeded with 25 grams of dry aluminum hydroxide and precipitated in round polyethylene bottles rotated for 24 hours at 74° C. Product aluminum hydroxides were filtered using No. 42 Whatman paper, washed with 1 liter of hot distilled water, dried, weighed and submitted for quantometer analysis.

Figure 2:
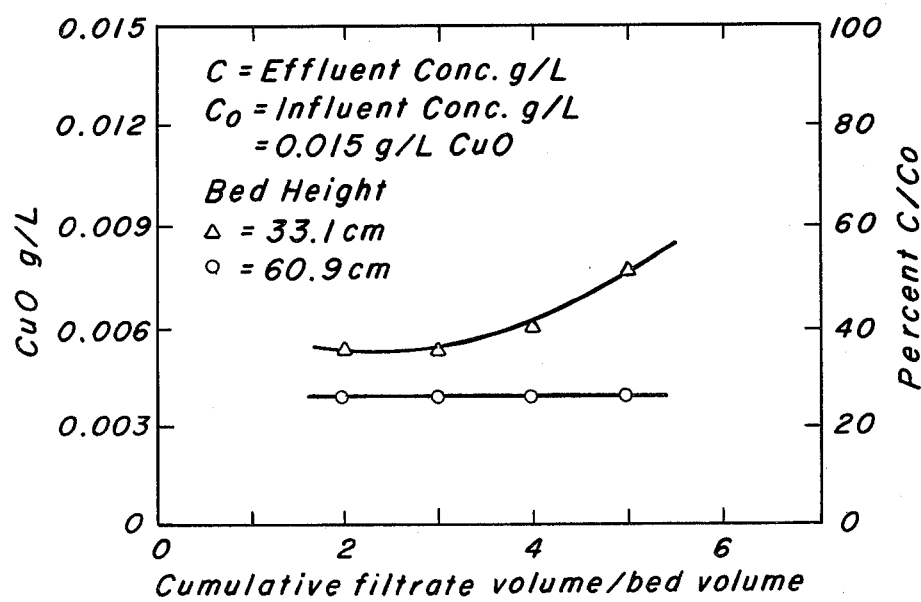
FIG. 2 is a set of breakthrough curves, showing the effect of the filtration process of the invention on CuO concentrations in the Bayer liquor.
Figure 3:
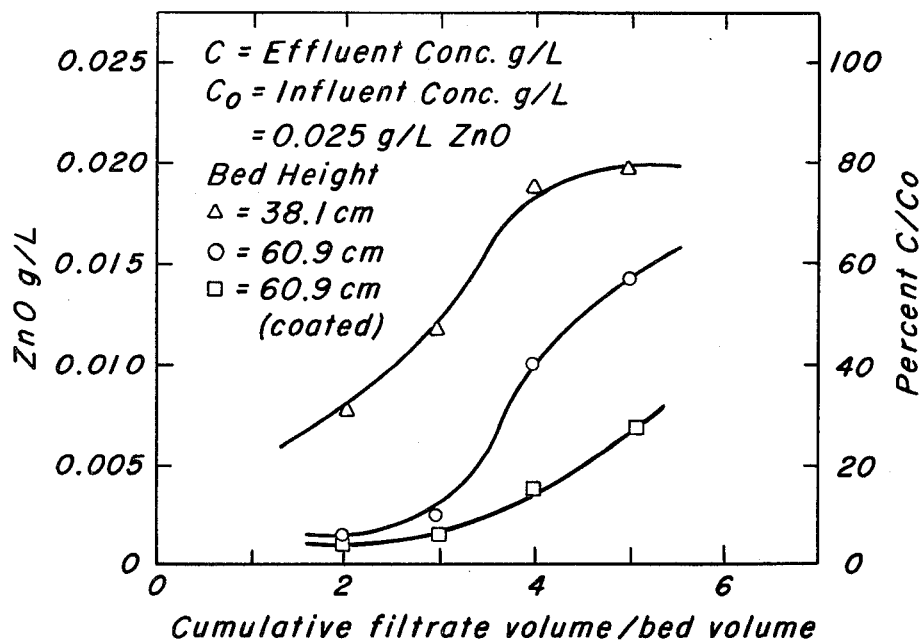
FIG. 3 is a set of breakthrough curves, showing the effect of the filtration process of the invention on ZnO concentrations in the Bayer liquor.

Results of the tests are shown in FIGS. 2 and 3 as the breakthrough curves for CuO and ZnO. Throughout these experiments, the influent liquors used contained 0.015 g/L CuO and 0.025 g/L ZnO. Volume of the filter bed 20 was approximately 1000 ml.

FIG. 2 for the copper removal test indicates that at a bed height of 38.1 cm for the first 2000 ml collected filtrate volume, about 0.009 g/L CuO was removed from the feed stream. This removal rate was decreased to about 0.006 g/L as the amount of collected cumulative volume was increased to 5000 ml. When the bed height was increased to 60.9 cm, a consistent 0.011 g/L CuO removal rate was achieved throughout the collected cumulative filtrate volume of 5000 ml for the first one hour of filtration cycle.

FIG. 3 for the zinc removal test shows that at a bed height of 38.1 cm, the zinc removal rate was lowered from 0.018 g/L for the first 2000 ml collected filtrate volume to 0.005 g/L for the 5000 ml cumulative filtrate volume. When the bed height was increased to 60.9 cm, the corresponding zinc removal rate was increased to 0.023 g/L and then decreased to 0.010 g/L for the 5000 ml cumulative filtrate volume. Coating the same sand bed of 60.9 cm with saturated zinc sulfide solution improved the zinc removal rate from 0.010 to 0.018 g/L for the first one hour filtration cycle.

The experimental data indicate how the decrease in effluent concentration is affected by the depth of the filter medium. The breakthrough curves shown in FIGS. 2 and 3 indicate further that the concentration ratios $C/C_o$, at a particular bed depth, increase as filtration time proceeds. The term C refers to effluent concentration of CuO or ZnO in grams per liter, and the term $C_o$ refers to influent concentration of CuO or ZnO in grams per liter. As filtration progresses, the bed layer is saturated with deposit.

Compared to zinc, copper has a longer breakthrough period, indicating that the process filter 10 of the invention is more effective for copper removal than for zinc removal.

The corresponding average CuO and ZnO contents of the precipitated aluminum hydroxide obtained in these experiments are shown in Table 4.

TABLE 4

Digestion of Bauxite Precipitation Data

| Digest No. | Liquor Analysis (g/L) | | Product $Al_2O_3$ Analysis Percentage by Weight | | | | | Bed Height (cm) |
|---|---|---|---|---|---|---|---|---|
| | ZnO | CuO | $SiO_2$ | $Fe_2O_3$ | CaO | CuO | ZnO | |
| Pressure Filtration with Filter Aid Added | | | | | | | | |
| 1 | 0.024 | 0.012 | 0.009 | 0.014 | 0.040 | 0.012 | 0.050 | — |
| Process Filtration | | | | | | | | |
| 2 | 0.009 | 0.003 | 0.004 | 0.004 | 0.019 | 0.002 | 0.012 | 60.9 |
| 3 | 0.018 | 0.005 | 0.006 | 0.003 | 0.028 | 0.005 | 0.033 | 38.1 |
| 4[1] | 0.005 | 0.001 | 0.003 | 0.004 | 0.020 | 0.002 | 0.006 | 60.9 |

NOTES:
[1]Filter bed coated with zinc sulfide

When the settler overflow liquors were filtered using a conventional Kelly pressure filter, the average CuO and ZnO contents of the precipitated aluminum hydroxide were respectively 0.012 and 0.050 percent by weight of aluminum oxide. These compare to the CuO and ZnO values of the product alumina precipitated from plant liquor in the laboratory of respectively 0.023 and 0.045 weight percent.

When the settler overflow liquors were filtered using the process filter with a sand bed of 38.1 cm, for the first one hour filtration cycle, the corresponding average CuO and ZnO contents of the precipitated aluminum hydroxide were respectively 0.005 and 0.033 percent by weight of aluminum oxide. When the bed height was increased to 60.9 cm, the corresponding average values were respectively 0.002 and 0.012 weight percent. For the same bed height, coating the sand particles using saturated zinc sulfide solution further lowered the average ZnO content to 0.006 weight percent. The CuO content in this case was not further decreased.

Figure 4:
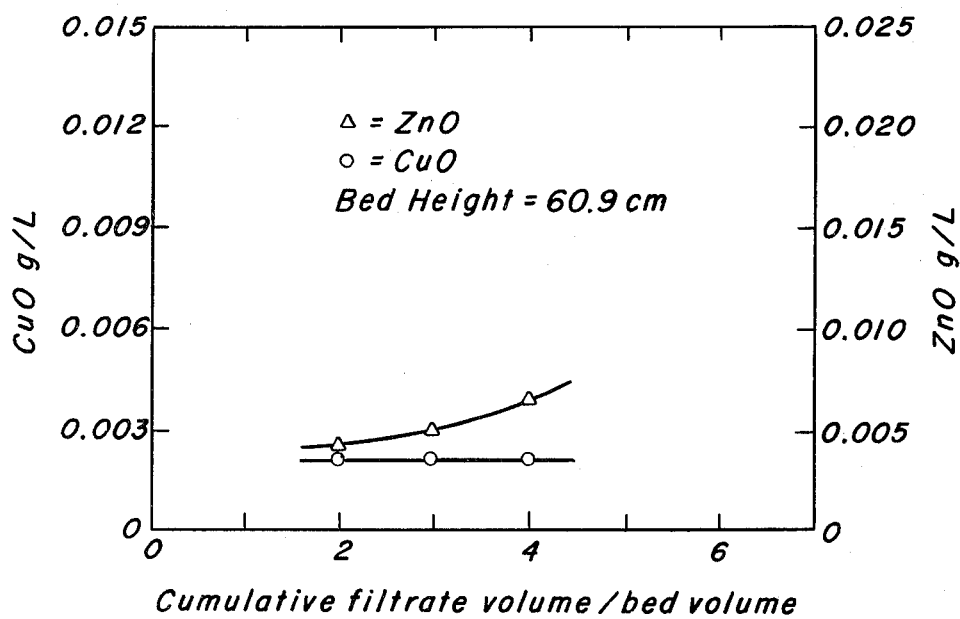
FIG. 4 is a set of breakthrough curves, showing the effect on filtration of CuO and ZnO from the Bayer liquor when the process filter of the invention is rejuvenated with a dilute acid solution.

As shown in FIG. 4, rejuvenating the used sand bed 20 at room temperature with 1 N HCl solution in the amount of 5 times the bed volume restored the removal capability of the sand bed. CuO and ZnO contents of the effluent filtrate were lowered to average values of respectively 0.002 and 0.005 g/L for the first 4000 ml collected filtrate volume. Rejuvenation may also be accomplished with dilute aqueous solutions of other inorganic acids such as $H_2SO_4$.

The above data indicate that the filtration process described and claimed herein is capable of lowering the CuO and ZnO contents in precipitated aluminum hydroxide produced from bauxite containing higher than normal levels of CuO and ZnO. For better ZnO removal the sand particles should be coated with a saturated metal sulfide solution.

Although the present invention has been described in conjunction with some preferred embodiments together with specific exemplary data, numerous changes and modifications can be made therein without departing from the spirit and scope of the following claims.

What is claimed is:

1. A process for decreasing the level of copper or zinc impurities in an alkali metal aluminate solution without increasing the sulfide content of the solution, said process comprising providing a filter bed comprising granular particles of a substance containing about 40 to 100% $Fe_2O_3$ by weight, said particles having an average particle size of about 100 to 400 $\mu$m, coating said particles with zinc sulfide prior to filtering, by passing a zinc sulfide solution through the bed and then washing in order to avoid sulfide contamination of the aluminate solution, and filtering the aluminate solution through the filter bed.

2. The process of claim 1 wherein the bed has a height of at least 38 cm.

3. The process of claim 1 further comprising the step of rejuvenating the bed by washing with a dilute aqueous solution of an inorganic acid, thereby to remove copper and zinc impurities from granular particles in the bed.

4. The process of claim 3 wherein said acid comprises HCl or $H_2SO_4$.

5. A filter medium for decreasing the level of copper or zinc impurities in an alkali metal aluminate solution without increasing the sulfide content of the solution, said filter medium comprising a bed of particles of a granular substance containing about 40 to 100 wt% $Fe_2O_3$, said particles having an average particle size of about 100 to 400 $\mu$m, and a zinc sulfide coating on said particles, said coating being formed by passing a zinc sulfide solution through the bed and then washing in order to avoid sulfide contamination of the aluminate solution.

6. The filter medium of claim 5 wherein said particles contain about 56.4 wt% $Fe_2O_3$.

* * * * *